(12) United States Patent
Griggs, III et al.

(10) Patent No.: US 6,588,342 B2
(45) Date of Patent: Jul. 8, 2003

(54) FREQUENCY ADDRESSABLE IGNITOR CONTROL DEVICE

(75) Inventors: James W. Griggs, III, Bradenton, FL (US); Scott D. Gagnon, Dover, FL (US); Clinton Boyd, Orlando, FL (US); J B Canterberry, Apollo Beach, FL (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/957,087

(22) Filed: Sep. 20, 2001

(65) Prior Publication Data

US 2003/0056677 A1 Mar. 27, 2003

(51) Int. Cl.[7] .............................. F42D 1/05; F42C 15/40; F42C 19/12; F42B 3/12; F42B 3/188
(52) U.S. Cl. ................................ 102/202.2; 102/202.1; 102/202.5; 102/206; 102/215
(58) Field of Search .............................. 102/200, 202.1, 102/202.2, 206

(56) References Cited

U.S. PATENT DOCUMENTS

| | | | | |
|---|---|---|---|---|
| 4,685,396 A | * | 8/1987 | Birse et al. .................. 102/206 |
| 5,533,454 A | * | 7/1996 | Ellis et al. ................ 102/202.1 |
| 5,773,749 A | * | 6/1998 | Cotton, III et al. ......... 102/217 |
| 6,173,651 B1 | * | 1/2001 | Pathe et al. .................. 102/218 |

* cited by examiner

Primary Examiner—Bernarr E. Gregory
Assistant Examiner—H. A. Blackner
(74) Attorney, Agent, or Firm—Lonnie Drayer

(57) ABSTRACT

A frequency addressable ignitor control device utilizes electronic bandpass filters tuned to a unique center frequency and bandwidth for each ignitor. Energy generated by the system's controller comprises one or more narrow pulses whose center frequency corresponds to one or more bandpass filter/ignitor assemblies and sufficient energy for activation. A plurality of bandpass filter/ignitor assemblies are connected in parallel in the system. The controller generates electrical pulses of different frequencies transferred to the plurality of bandpass filter/ignitor assemblies via a two wire ignitor bus. Bandpass filter/ignitor assemblies whose filter allows sufficient energy to pass to an ignitor bridge element initiates the ignitor's explosive charge. The controller generates energy to the ignitor with appropriate sequence of frequencies and delays resulting in the desired detonation of appropriate individual bandpass filter/ignitor assemblies in the desired sequential order each with the desired delays.

3 Claims, 5 Drawing Sheets

FREQUENCY ADDRESSABLE IGNITOR CONTROL DEVICE

BACKGROUND OF THE INVENTION

The present invention relates to ignitors or detonators which are connected to a single two wire bus, in general and control systems which can individually communicate with or address individual ignitors over a two wire bus.

In many applications where a multiplicity of ignitors are used, it is desirable to be able to control the initiation and test of individual ignitors over a two wire bus. Using a bus architecture substantially reduces the total wiring required which typically reduces costs, and simplifies assembly of the ignitor arrangement. Such bus architectures addressing multiple ignitors can be used in a wide variety of applications ranging from a use in automobiles to initiate multiple safety systems in the event of a crash, to the use of various explosives in mining and geoseismology.

Recently, technology has been developed which employs microprocessors in combination with an ignitor which can be addressed over a data bus. These so-called smart ignitors allow information concerning the status of individual ignitors to be requested by a controller. The same controller can send an addressed signal to a particular ignitor causing it to begin internal testing, or to initiate an explosive or gas generating chemical charge.

The so-called smart ignitors bring new functionality and perhaps cost savings to many ignitor applications. However, such ignitors may not be desirable in all situations where it is desirable to be able to use a bus structure for communicating with multiple ignitors. In particular, a smart ignitor may require an integrated package between the ignitor and the microprocessor, which handles the protocols of bus architecture. In some applications it may be desirable to use different kinds of ignitors on the same bus. Or it may be desirable to use ignitors with relatively low volume production where integration of a microprocessor into the ignitor may not be cost-effective. In some applications repeaters may be necessary to assure that data signals can be transmitted over long bus wires.

What is needed is an ignitor system which can address multiple ignitors over a bus, to initiate the ignitors or to perform a functional test on the ignitors.

SUMMARY OF THE INVENTION

The ignitors and the ignitor control system of this invention employs individual ignitors which are connected to a bus through a unique bandpass filter. The ignitor control system generates a signal with a frequency corresponding to a bandpass filter associated with a particular ignitor. The signal either contains sufficient energy to initiate the ignitor or is set at a no-fire level, which can be used to detect the presence and integrity of a particular ignitor. Such a system requires no intelligence at the ignitor, the ignitor is a completely passive component until initiation, and the energy pulse can be tailored to the needs of a particular ignitor. Thus a pre-existing ignitor may be combined with a bandpass filter or a specially designed ignitor may incorporate a bandpass filter. A large number of individual ignitors may be placed on a single bus limited only by the frequency bandwidth of the bus, which is capable of transmitting the necessary power. For a twisted wire pair a reusable frequency range may extend between a few kHz and a few hundred kHz which might accommodate twenty or more unique frequencies which can be used to address 20 or more discrete initiators. A twisted wire pair might be usable at frequencies as high as 10 MHz.

The ignitor control system of the invention comprises two components: a controller for generating and receiving frequency pulses, and a voltage and current amplifier which provides the necessary voltage and current to test or initiate ignitors on the bus, and receives and conditions reflected signals received over the ignitor bus.

It is a feature of the present invention to provide an ignitor control system, which can function over long ignitor bus transmission lines.

It is another feature of the present invention to provide an ignitor control system, which can initiate and test with a multiplicity of ignitors connected in parallel to a bus.

It is a further feature of the present invention to provide an ignitor system which can uniquely communicate with ignitors on a bus where the individual ignitors are not required to have intelligence.

It is a still further feature of the present invention to provide an ignitor system which can function with ignitors that require different levels of energy, or combinations of current, voltage, and time to be initiated.

It is a yet further feature of the present invention to provide an ignitor system, which can perform passive tests on the individual ignitors, connected to a bus.

Further features and advantages of the invention will be apparent from the following detailed description when taken in conjunction with the accompanying drawings.

DESCRIPTION OF THE PREFERRED EMBODIMENTS

Figure 1:
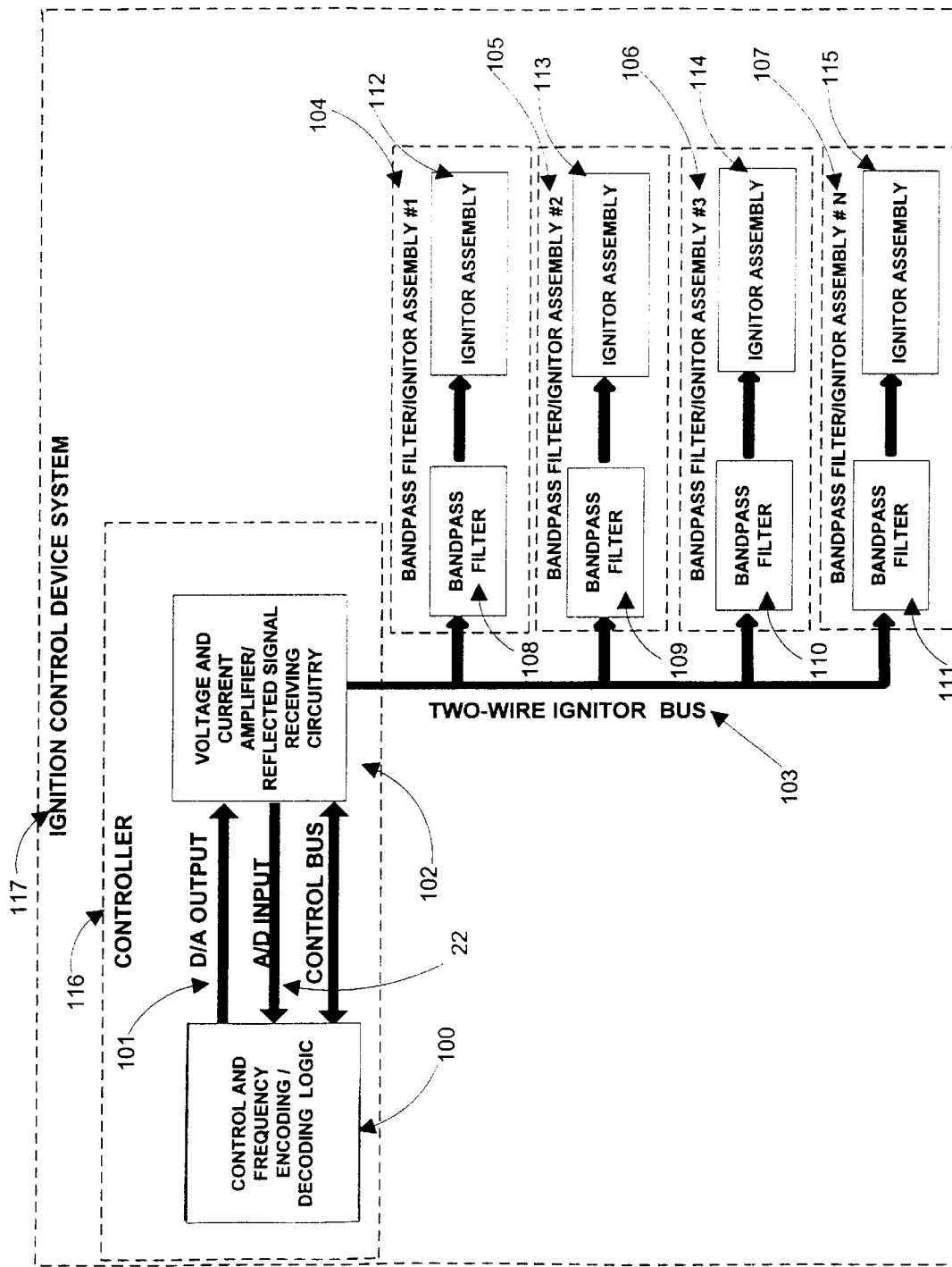
FIG. 1 is a top-level block diagram of the ignition control device system of this invention.

Referring more particularly to FIGS. 1–5 wherein like numbers refer to similar parts, FIG. 1 shows an overview of the ignition control system 117. The ignitor control system 117 is composed of three components: a controller 116, a two-wire bus 103, and a bandpass filter ignitor assembly 104–107. The controller 116 sends out over the bus 103 narrow-band signals centered about selected frequencies. The narrow-band signals have for example a 40 V peak and current of two amps, and the duration of 1 to 1.5 milliseconds. The narrow-band signal is centered around a discrete frequency selected within the frequency range of approximately 3 kHz and 300 kHz. Thus the total power provided is approximately 80 watts of power, or total energy delivered of 0.08 to 0.12 Jules.

Figure 5:
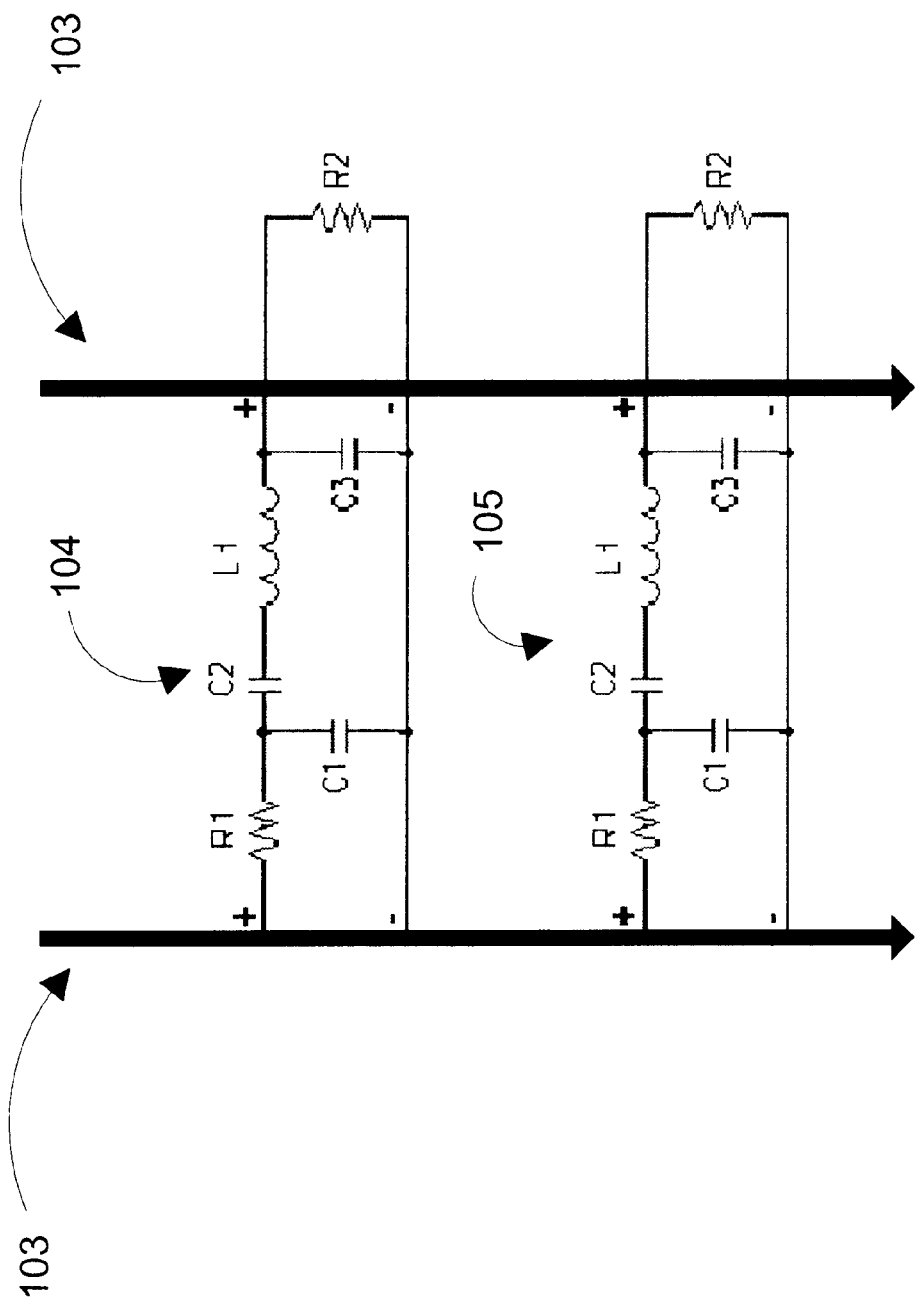
FIG. 5 is a schematic diagram of bandpass filters tuned for a two-Ohm bridge wire, each with a unique center frequency.

The narrow-band signal propagates along the two wire bus 103 and, if it meets a matching impedance load, power is delivered to that impedance load which is, for example, a two Ohm bridge wire of an ignitor, which is connected to the bus by an inductance Capacitance circuit such as shown in FIG. 5. The inductance Capacitance circuit forms a bandpass filter that presents little or no resistance to the signal frequency that corresponds to the bandpass filter. The following values are used in the circuit diagrams shown in FIG. 5 to produce the bandpass characteristics shown in FIG. 2, wherein R1 is 0.1 ohm and R2 is a BRIDGE-WIRE having a resistance of 2.0 Ohms.

|     | C1     | C2     | L1      | C3    |
| --- | ------ | ------ | ------- | ----- |
| 201 | 100 nF | 600 nF | 1.8: H  | 6: F  |
| 202 | 100 nF | 600 nF | 3.3: H  | 6: F  |
| 203 | 100 nF | 600 nF | 5.6: H  | 6: F  |
| 204 | 100 nF | 600 nF | 10: H   | 6: F  |
| 205 | 100 nF | 600 nF | 18: H   | 6: F  |
| 206 | 100 nF | 600 nF | 33: H   | 6: F  |
| 207 | 100 nF | 600 nF | 56: H   | 6: F  |
| 208 | 100 nF | 630 nF | 100: H  | 6: F  |
| 209 | 100 nF | 640 nF | 200: H  | 6: F  |
| 210 | 100 nF | 600 nF | 300: H  | 6: F  |
| 211 | 100 nF | 600 nF | 470: H  | 6: F  |
| 212 | 100 nF | 640 nF | 640: H  | 26: F |
| 213 | 100 nF | 600 nF | 1000: H | 26: F |
| 214 | 200 nF | 650 nF | 1300: H | 26: F |
| 215 | 200 nF | 750 nF | 1800: H | 26: F |
| 216 | 200 nF | 750 nF | 2400: H | 26: F |
| 217 | 200 nF | 750 nF | 3100: H | 26: F |
| 218 | 200 nF | 750 nF | 4100: H | 26: F |
| 219 | 20 nF  | 860 nF | 5200: H | 26: F |
| 220 | 20 nF  | 840 nF | 7000: H | 26: F |

Thus the controller 116 can uniquely initiate a particular ignitor 112 by sending a narrow-band pulse of a frequency which matches the design frequency of the bandpass filter 108 associated with that particular ignitor 112.

The controller 116 can perform a second function by sending a narrow-band pulse which is not a sufficient amplitude to cause initiation of an ignitor. If any narrow-band pulse does not meet with an impedance matched load it will be reflected along the bus back to the controller 116. The controller receiving the reflected signal can detect that a particular bandpass filter ignitor combination is not present my detecting the reflected returned signal. If a particular bandpass filter ignitor combination is present and if the narrow-bandpass pulse is not a sufficient amplitude to cause initiation of signal will be absorbed by the ignitor will not be initiated providing a check of the presence of the ignitor and its functionality.

The controller 116 may be programmed to know what ignitors with what bandpass filters are present on the bus, alternatively the controller 116 can slue through the design frequency range detecting all impedance matched loads connected to the bus and provide a readout of the detonators which are connected to the bus and therefore can be initiated.

The effect of using a controller 116 which sends out selected narrow frequency power pulses along the two wire bus 103, is that the controller 116 so long as it sends only signals at a selected frequency is in some sense connected only to a single initiator, that is the initiator which is connected to the bus by a bandpass filter which will pass the selected frequency. This means that the other parameters other than frequency such as signal current and voltage, and duration can be varied to meet the unique requirements of the particular initiator. Thus initiators of various types with different initiation power/voltage/current requirements could be placed on the same bus. As long as only the selected frequency is send, even command data could be selectively send to an ignitor containing intelligence, or a passive ignitor without active components could nevertheless be commanded, between two or more optional modes of operation by the power/voltage/current transmitted at the selected frequency.

In the field of mining often a number of explosive charges will be detonated simultaneously so that the total number of charges which may be relatively large will be broken down into a smaller number of groups, of charges which are to be detonated simultaneously. By equipping charges which are to be detonated simultaneously with the same bandpass filter the controller 116 could cause the initiation of a group of charges with a single larger energy pulse at the selected frequency.

The controller 116 may comprise a number of components as shown in FIG. 1. The controller itself 116 may be any type of programmable controller, and may receive instructions from, or actually be a vehicle safety system with a vehicle safety system logic, such as onboard vehicle systems that receive sensor data input and determine the timing of initiation of safety systems such as airbags, seatbelt retractors, and passenger positioning devices. Or the programmable controller may be a general-purpose blasting machine which when hooked up to a two wire bus can provide information about the attached detonators, and allows input either manually or for another source, the timing sequence of the initiation signals, status check of the ignitors, and final arming and initiation of the ignitors.

It should be understood that particularly in the mining industry the ignitors may contain built-in protecting delays. For example each ignitor could incorporate a delay of the same line, so that all charges would be initiated, before the first explosive charge is set-off.

The components of an ignition control device system 117 are shown in FIG. 1. The controller assembly 116 includes control and frequency encoding/decoding logic circuitry 100 and voltage and current amplifier circuitry/reflected signal receiving circuitry 102. The pulse output of the control and frequency encoding/decoding logic circuitry 100 is generated by using a discrete oscillator, discrete D/A converter, or D/A converter output as part of a microprocessor. The pulse output of the control and frequency encoding/decoding logic circuitry 100 is connected via D/A output 101 to the voltage and current amplifier circuitry/reflected signal receiving circuitry 102. The output of the voltage and current amplifier circuitry/reflected signal receiving circuitry 102 is conducted by the two-wire ignitor bus 103 to a quantity of N number bandpass filter/ignitor assemblies 104–107. These modules include bandpass filters 108–111 and ignitor assemblies (or other energy transfer elements) 112–115. Low amplitude bridge wire verification test signals generated by the controller 116 and routed to the bandpass filter/ignitor assemblies 104–107 via the ignitor bus 103 are reflected back through the ignitor bus 103 through the voltage and amplifier/reflected signal receiving circuitry 102, through the A/D input 22 to the control and frequency encoding/decoding logic 100 circuitry.

Figure 2:
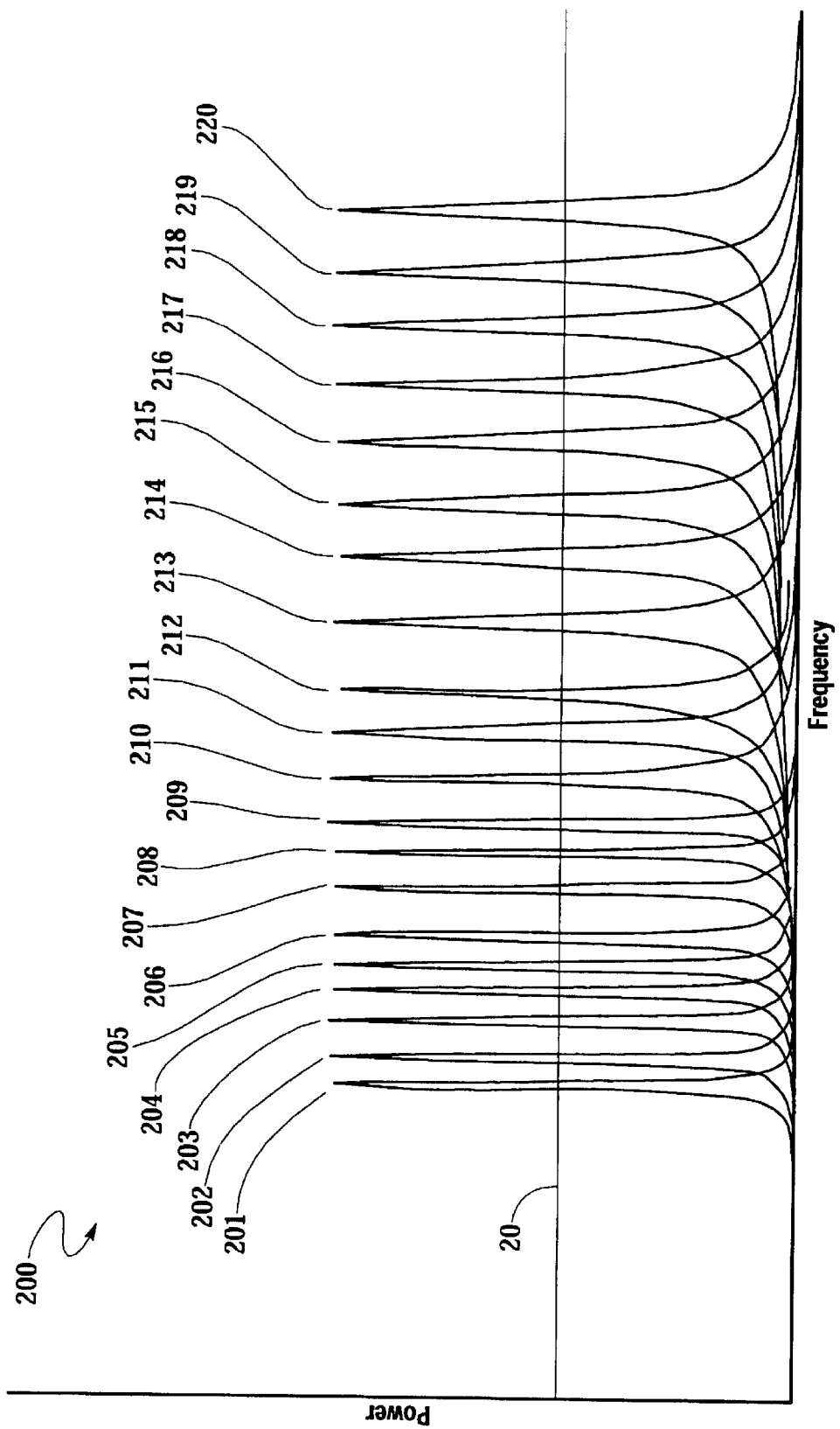
FIG. 2 is a view of a frequency vs. power plot of twenty bandpass filter characteristics.

Plots of the frequency vs. power characteristic waveforms 201–220 of twenty examples of bandpass filter/ignitor assemblies 104–107 are shown in FIGS. 1 and 2. Center frequency components of waveforms 201–220 are unique from and not overlapping above a "no-fire" power value 20. A collection 200 of waveforms 201–220 correspond with filter circuits 104, 105, 106, 107 that are shown in FIG. 1.

The ignition control device system 117 improves the functionality of the ignitor systems used in the mining industry and automotive applications such as air bag inflation. The ignition control device system 117 of this invention has addressable bandpass filter/ignitor assemblies 104–107 as shown in FIG. 1, an onboard processor 100, together with an application tailorable voltage and current amplifier/reflected signal receiving circuitry 102. The ignition control device system can verify status of the bandpass filter/ignitor assemblies 104–107, and then initiate a sequence of detonations, with variable delays (when appropriate), of gas generator or other device upon command from the ignition control device system controller 117.

The solution to the problems inherent in wider application of advanced ignitors is the ignition control device system 117 illustrated in the top-level block diagram of FIG. 1.

The ignition control device system controller 116 is connected to two wires 103 making up the bus over which signals from the controller 116 are transmitted. The controller 116 has analog transmission line receiver circuits in the controller 100 that perform the function of detecting the voltage transitions that are used to detect reflected power from the plurality of bandpass filters/ignitors 104–107 during a bandpass filter/ignitor assembly validation test. The line receiver circuits are connected to an A/D input 22 that may be separate or contained in the microprocessor in the controller 100 on which a logic program operates. The microprocessor in the controller 100 is in turn connected in data sending relation to voltage and current amplifier circuitry/reflected signal receiving circuitry 102 in the controller 100. The voltage and current amplifier circuitry/reflected signal receiving circuitry 102 is in turn connected in data sending relation to a two wire ignitor bus 103.

A voltage and current amplifier/reflected signal receiving circuitry 102 is connected to the bus 103. The voltage and current amplifier/reflected signal receiving circuitry 102 is designed to supply different power requirements to different applications. Ignitor bus lengths of over a mile for seismic applications require greater voltage and current amplification than a mining application utilizing an ignitor bus length of hundreds of yards because of the degradation of electronic signals transmitted over transmission lines over various distances. Automotive applications require less amplification from the voltage and current amplifier/reflected signal receiving circuitry 102 than either the mentioned seismic or mining applications because of the shorter ignitor bus transmission line length.

The components making up the bandpass filter/ignitor assemblies 104–107, including the bandpass filters 108–111 and ignitor components 112–115, are conventional, and their selection and design are well understood by those skilled in the art. It should be understood that various design strategies may be employed where the various components may be incorporated into a single chip or component, or may comprise multiple components. The components may be custom-designed or off-the-shelf components.

It should also be understood that the control and frequency encoding/decoding logic 100 may include one or more microcontrollers, microprocessors, or other control components, may be programmable, and may employ various types of memory including RAM and ROM. In the most basic configuration, the control and frequency encoding/decoding logic 100 simply acts to generate signals to the voltage and current amplifier/reflected signal receiving circuitry 102, and to receive, digitize, and analyze reflected signals during a validation test on parts of the ignition control device system including but not limited to the ignitor bus 103 and one or more bandpass filter/ignitor assemblies 104–107. The control and frequency encoding/decoding logic 100 may also perform more advanced functions based on the results of pass and fail conditions resulting from validation tests required by various applications and uses of the ignition control device system.

To perform the foregoing functions the bandpass filter in each bandpass filter/ignitor assembly 104–107 must be assigned a unique center frequency and bandpass characteristics so that the controller 116 can address signals directly to it. Thus it will be understood by those skilled in the art, how to perform bandpass filter designs in the bandpass filter/ignitor assemblies 104–107 and use the intelligence contained in the control and frequency encoding/decoding logic 100 on board the controller 116 to attain the foregoing functions.

Figure 3:
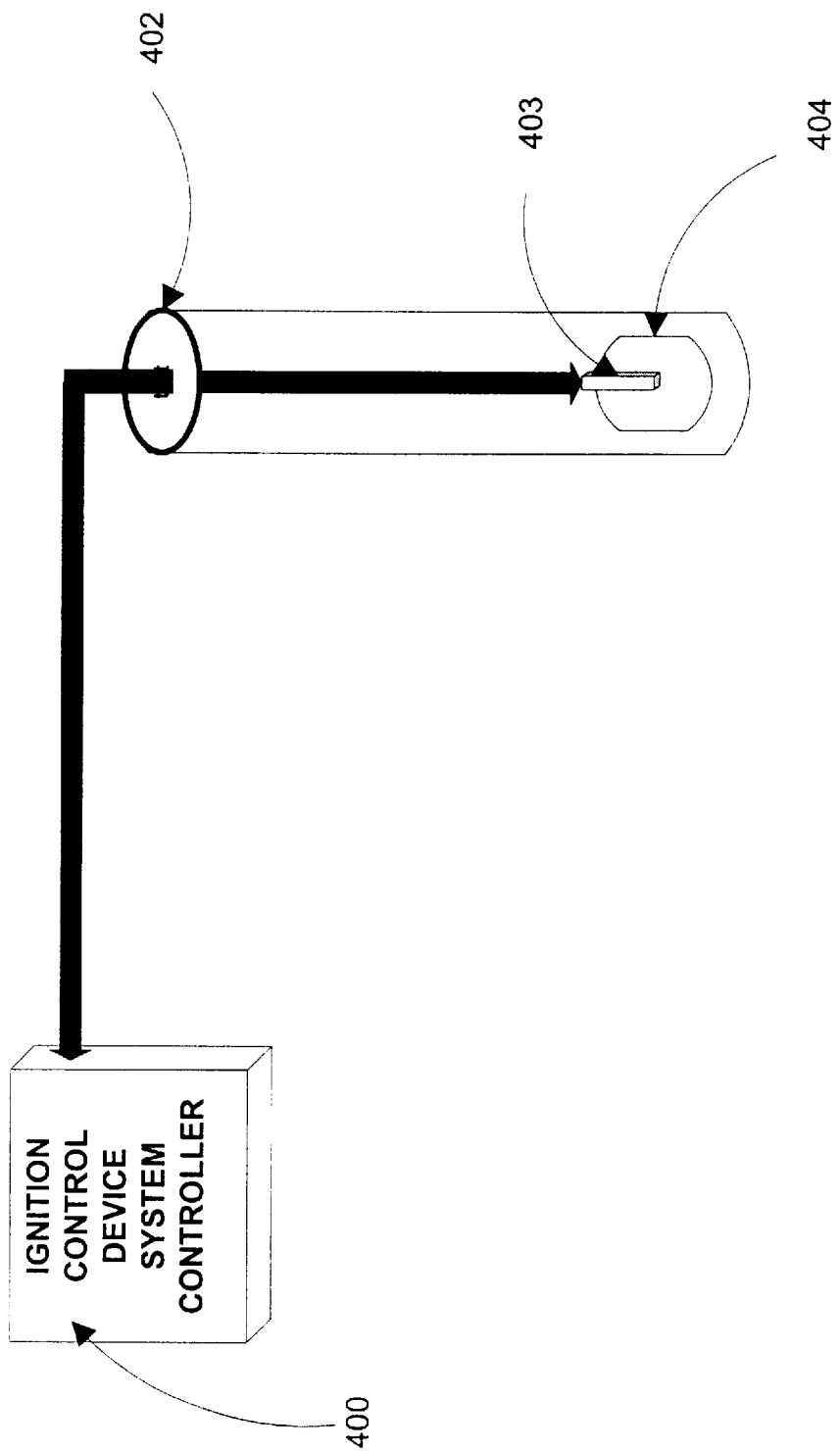
FIG. 3 is an illustrative view of an example of an ignition control device system communications topology in a seismic application.

An ignition control device system communications topology in a seismic application is shown in FIG. 3. As shown in FIG. 3, the ignition control device system 400 and 403 may be used over very long wire lengths, such as in a borehole 402. A pyrotechnic charge 404 may be used in seismographic testing where multiple charges may be strung out along the length of a borehole which may be several miles deep, or alternatively explosive charges can be used to penetrate the casing of a borehole, to take a sample, or to produce oil or gas.

Figure 4:
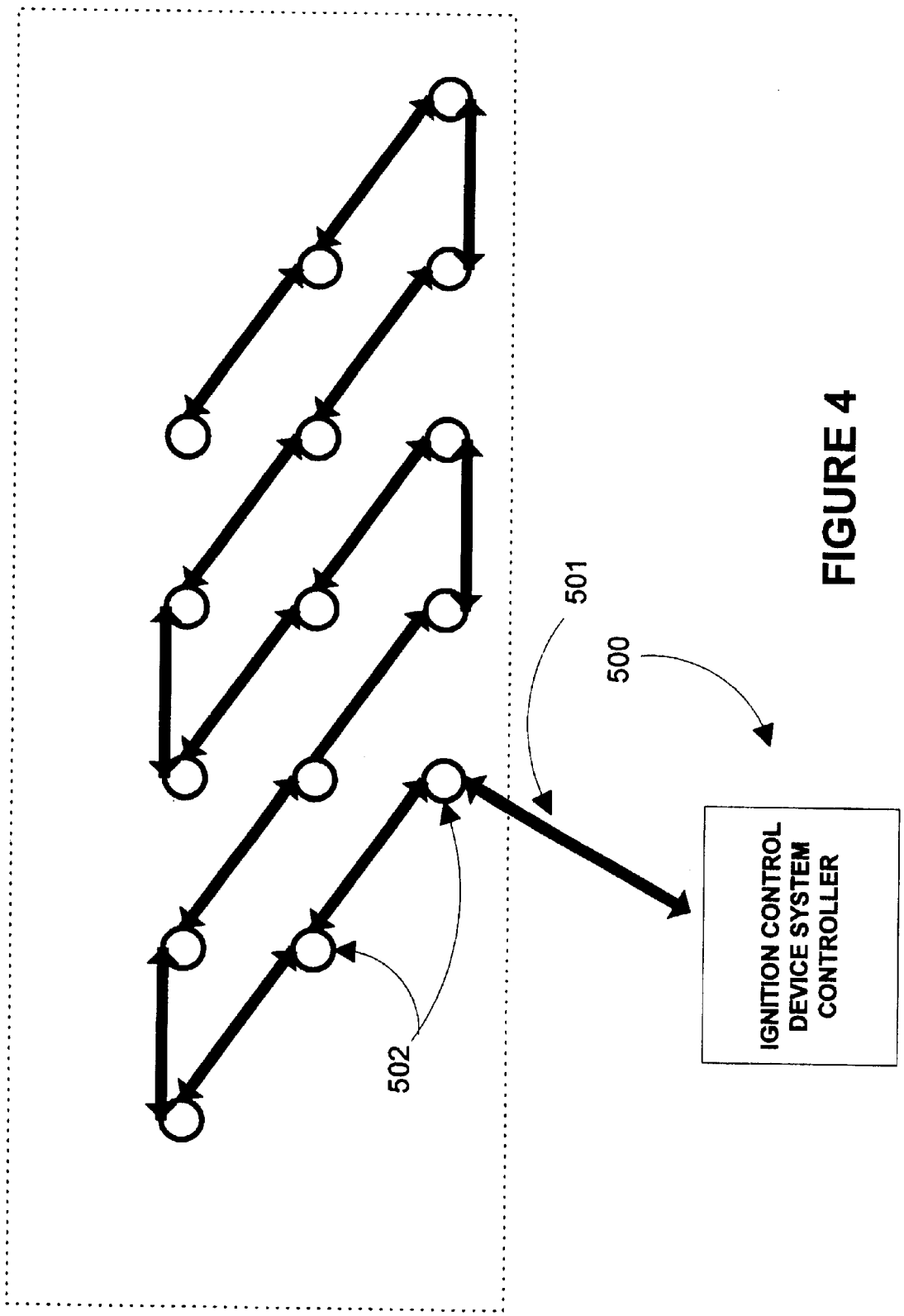
FIG. 4 is an illustrative view of an example of an ignition control device system topology in a quarry application.

An ignition control device system communications topology in a quarry application is shown in FIG. 4. When used in a mining operation, an array of explosive packed packages is used to break rock, sometimes in the open pit mining bench, sometimes in an underground heading, but in either instance the charges may be initiated from a relatively great distance, and multiple charges may be used in a single borehole, with a large number of boreholes being detonated more or less simultaneously. Typically, timing of the detonations is varied over a small interval of time to allow one body of rock to break before another portion of rock in order to optimize the amount of rock broken and the size and shape of the opening created. The advantages in the blasting industry of a pyrotechnic initiation system with the flexibility available with an ignition control device system , where all the components are connected by a two-wire bus, is evident. FIG. 4 shows an ignition control device system 500 used over a long transmission wire length 501, such as used in a plurality of detonation holes 502 containing bandpass filter/ignitor assemblies 104–107. A pyrotechnic charge is also used in detonation holes 502 to generate the required energy.

It should be understood that the control and frequency encoding/decoding logic 100 line receivers and A/D converters have the functionality to detect any analog signals, thus allowing analog signals to be detected from a separate two wire bus connected to the furthest distance point of the ignitor bus 103 and sent to the control and frequency encoding/decoding logic 100 information representing the signal quality on the ignitor bus 103. The control and frequency encoding/decoding logic 100 could then command the voltage and current amplifier/reflected signal receiving circuitry 102 to increase or decrease amplification to attain optimal signal quality at the furthest distance point of the ignitor bus 103. In addition, the D/A incorporated in the control and frequency encoding/decoding logic 100 could monitor the electrical noise levels of the ignitor bus 103 and determine the usable status of the ignitor bus 103.

The control and frequency encoding/decoding logic 100 may be an Application-Specific Integrated Circuit, general-purpose microprocessor, controller or computer, and typically will employ one or more types of memory such as, for example, flash memory, EPOM, EEPROM, PROM, ROM, static random access memory (RAM), or dynamic RAM.

It should be understood that the ignitor bus 103 may be considered as a single bus which extends from the controller 116 to the most distant bandpass filter/ignitor assembly 104–107.

It should be understood that the frequency range is not limited to those illustrated and described with respect to FIG. 2, but could be a higher frequency depending on the carrying capabilities of the bus 103.

It should be understood that, generally, when the controller 116 sends an initiation signal to a particular bandpass filter/ignitor assembly 104 the initiation signal will be sent at a frequency about which the bandpass filter is centered. However, it should be understood for purposes of the claims that where a frequency is referred to both to define the bandpass filter and to define the frequency of the initiation signal the signals should be understood to include some difference in frequency, but not so large a difference as to substantially affect the ability of the signal to be uniquely received and effective in the intended bandpass filter/ignitor assembly.

It is understood that the invention is not limited to the particular construction and arrangement of parts herein illustrated and described, but embraces all such modified forms thereof as come within the scope of the following claims.

We claim:

1. A pyrotechnic system comprising: a controller, capable of generating narrow-band frequency signals of sufficient energy to initiate an ignitor; a two wire bus connected to the controller to receive the narrow-band frequency signals; and a plurality of ignitor assemblies, connected in parallel to the two wire bus, each ignitor assembly having a bandpass filter frequency blocking relation with an ignitor, so that only a selected frequency transmitted by the controller can initiate the ignitor, the controller is capable of generating narrow-band frequency signals of a first energy level which is insufficient to initiate an ignitor, and the controller is capable of generating narrow-band frequency signals of a second energy level which are sufficient to initiate an ignitor, and the controller has a means for receiving a reflected signal from the two wire bus.

2. The pyrotechnic system of claim 1 wherein each bandpass filter is composed of passive components not requiring power from the two wire bus.

3. The pyrotechnic system of claim 1 wherein the controller comprises: a digital controller for generating the narrow-band frequency signals; and an amplifier for amplifying and transmitting the narrow-band frequency signals on the two wire bus.

* * * * *